United States Patent [19]

Mertzweiler et al.

[11] 4,055,483

[45] Oct. 25, 1977

[54] HYDROREFINING OF HEAVY OIL WITH HYDROGEN AND ALUMINUM ALKYL COMPOUND

[75] Inventors: Joseph K. Mertzweiller; Roby Bearden, Jr., both of Baton Rouge, La.

[73] Assignee: Exxon Research & Engineering Co., Linden, N.J.

[21] Appl. No.: 710,800

[22] Filed: Aug. 2, 1976

[51] Int. Cl.$^2$ ............................................. C10G 23/02
[52] U.S. Cl. ................................ 208/213; 208/251 H
[58] Field of Search ............... 208/213, 215, 216, 217, 208/214, 209, 237, 238, 251 H, 254 H

[56] References Cited

U.S. PATENT DOCUMENTS

| | | | |
|---|---|---|---|
| 3,558,474 | 1/1971 | Gleim et al. | 208/213 |
| 3,645,912 | 2/1972 | Gatsis | 208/215 |
| 3,657,111 | 4/1972 | Gleim | 208/213 |

*Primary Examiner*—George Crasanakis
*Attorney, Agent, or Firm*—Marthe L. Gibbons

[57] ABSTRACT

A heavy hydrocarbonaceous oil containing a Group IB, IVB, VB, VIB, VIIB or VIII transition metal compound is upgraded by treatment with hydrogen or a hydrogen donor compound in the presence of an aluminum alkyl compound, for example, triethyl aluminum. The transition metal compound may be naturally occurring in the oil or added to the oil. A preferred transition metal compound is vanadyl phthalocyanine.

12 Claims, No Drawings

HYDROREFINING OF HEAVY OIL WITH HYDROGEN AND ALUMINUM ALKYL COMPOUND

BACKGROUND OF THE INVENTION

1. Field of the Invention

The present invention relates to a process for hydrorefining heavy hydrocarbonaceous oils which usually contain transition metal contaminants. The term "hydrorefining" is intended herein to designate a catalytic treatment of a hydrocarbonaceous oil in the presence of molecular hydrogen and/or a hydrogen donor compound, to upgrade the oil by eliminating or reducing the concentration of contaminants in the oil, such as sulfur compounds, nitrogeneous compounds, metal contaminants and/or to convert at least a portion of the heavy constituents of the oil, such as asphaltenes or coke precursors to lower boiling hydrocarbon products and to reduce the Conradson carbon residue of the oil.

2. Description of the Prior Art

It is known to hydrogenate a low sulfur content petroleum oil in the presence of a catalyst which comprises a support and a transition metal complexed with an organo-metallic compound such as an alkyl metal compound (see, for example, U.S. Pat. No. 3,658,692).

U.S. Pat. No. 3,502,571 discloses a process for hydrocracking a hydrocarbonaceous black oil utilizing a metal phthalocyanine catalyst.

It has now been found that heavy hydrocarbonaceous oils can be upgraded in a hydrorefining process by utilizing an unsupported, finely divided catalyst, which is prepared in situ in the hydrocarbonaceous feed from a transition metal compound and a metal alkyl compound.

SUMMARY OF THE INVENTION

In accordance with the invention, there is provided a process for hydrorefining a heavy hydrocarbonaceous oil containing a transistion metal compound, which comprises: adding an aluminum alkyl compound to said oil, and contacting the resulting mixture, in a hydrorefining zone, at hydrorefining conditions, with hydrogen or a hydrogen donor compound.

In one embodiment of the invention, a transistion metal phthalocyanine is added to the oil feed.

DETAILED DESCRIPTION OF THE INVENTION

The process of the invention is suitable for upgrading of a wide variety of hydrocarbonaceous oils containing carbon and hydrogen in varying ratios and which may further contain heteroatoms, such as sulfur, nitrogen and oxygen, and transition elements. It is well suited for treating heavy hydrocarbonaceous oils containing at least 1 weight percent sulfur contaminants. It is particularly well-suited for treating heavy hydrocarbonaceous oils which generally contain from about 10 to about 10,000 weight parts per million of transition metal compounds, either individual compounds or mixtures of different metal compounds. The term "transition metal" is used herein to designate, in the broadest sense, a metal having only partially filled "d" and "f" shells of electrons. Preferably, the transition metal is a metal of the so-called main transition elements. More preferably, the transition metal is a metal of the first and second series of the main group as defined by Cotton and Wilkinson in *Advanced Inorganic Chemistry*, p. 528, third edition, published by Interscience Publishers, N.Y.

By way of example, suitable feeds include petroleum crude oils, including heavy crude oil; reduced crude petroleum oils; residual oils, such as petroleum atmospheric and vacuum distillation tower bottoms products; tars; bitumen; tar sand oils; shale oils; coal extracts and products of coal liquefaction processes, and mixtures thereof. The hydrocarbonaceous feeds utilized in the process may contain up to about 10 weight percent sulfur contaminants and typically contain from about 2 to 6 weight percent sulfur contaminants. For use in the process of the present invention, the hydrocarbonaceous oil must contain at least one suitable transition metal compound in an effective amount. Suitable concentrations on one or more transition metal compounds, calculated as the metal based on the oil feed, include from about 0.005 weight percent to about 40 weight percent, preferably from about 0.01 to about 5 weight percent, more preferably from about 0.05 to about 1 weight percent. The required amount of transition metal compound need not occur naturally in the feed, although many of the feeds will generally contain at least a portion of the desired transition metal concentration. Thus, in the above-stated concentration ranges, the amounts refer to the total concentration of the transition metal compound (calculated as the metal), that is, the naturally occurring transition metal compounds plus transition metal compounds added to the feed to give the desired concentration. When a transition metal compound is added to the feed, it may be added prior to introducing the feed into the hydrorefining zone or the supplemental transition metal compound can be introduced directly into the hydrorefining zone to mix with the oil feed.

The metal constituent of the transition metal compound is generally selected from the metals of Group IB, IVB, VB, VIB, VIIB, and VIII of the Periodic Table of Elements. The Periodic Table referred to herein is in accordance with the *Handbook of Chemistry and Physics* published by the Chemical Rubber Publishing Co., Cleveland, Ohio, 45th edition (1964). Suitable transition metals include iron, cobalt, nickel, platinum, tungsten, chromium, vanadium, molybdenum, rhenium, manganese, titanium, zirconium, palladium, rhodium, copper and mixtures thereof.

The supplemental transition metal compound may be added to the oil feed in the form of oxides, sulfides, halides, metal-containing organic compounds, e.g. metal salts of carboxylic acids, 1-3-diketone complexes, etc. The supplemental transition metal compound is added to the oil feed without a support or carrier. The addition of the transition metal compounds to the feed as the metal phthalocyanine is particularly preferred.

An aluminum alkyl compound is added to the oil feed either prior to introducing the oil feed into a hydrorefining zone or by injecting the alkyl metal compound directly into the hydrorefining zone. It should be noted that prior to contacting the oil feed with the aluminum alkyl compound, the oil feed is usually treated to remove materials (other than the transition metal compounds) which would react with the aluminum alkyl compound, for example, "poisons" such as active hydrogen compounds, water, alcohol, carboxylic acids, etc. For example, the feed can be stripped with an inert gas above about 700° F. for a brief period of time to remove water and to decompose and remove carboxylic acid groups and peroxides.

Suitable aluminum alkyl compounds for use in the process of the present invention have the general formula $R_aM_nX_b$ wherein R is an alkyl group (monovalent saturated aliphatic hydrocarbon constituent), M is a metal, n is the valence of the metal, a is an integer ranging from 1 to n, X is a halogen, b is an integer from 0 to n, such that the sum of a and b equals n. Preferably, R is an alkyl group containing from about 1 to about 18 carbon atoms, more preferably from about 1 to 12 carbon atoms, most preferably the alkyl group is ethyl. The metallic constituent, M, in the above formula is an aluminum constituent. When the metal alkyl compound is a halide, the preferred halide is a chloride or bromide. Preferred metal alkyl compounds are triethyl aluminum, triisobutyl aluminum, diethyl aluminum hydride, diisobutyl aluminum hydride and diethyl aluminum chloride.

The hydrocarbonaceous oil feed, transition metal compound (which is either present in sufficient amount in the oil or with the supplemental amount of added extraneous transition metal compound) and the metal alkyl compound are introduced into a hydrorefining zone to contact hydrogen. The hydrorefining zone may be operated at a temperture ranging from about 500° F. to about 1500° F., preferably at a temperature ranging from about 700° to about 1000° F., more preferably at a temperature ranging from about 800° to 850° F. and at a pressure ranging from about 500 to about 5,000 pounds per square inch gauge (psig), preferably from about 1500 to 3000 psig, depending upon the desired end results. Although applicants do not wish to be bound by theory, it is believed that a catalyst is formed in situ during the course of the reaction as follows. Contact of the metal alkyl compound with a transition metal compound in the oil feed reduces at least part of the transition metal to a lower valence state. The mole ratio of aluminum alkyl compound to transition metal will vary widely depending on the concentration of reactive poison ($H_2O$, oxygen, mercaptans, etc.) contained in various feeds that will consume the aluminum alkyl compound. On a poison-free basis, a suitable mole ratio of aluminum alkyl compound to total moles of transition metals for use in the process of the present invention ranges from about 1:1 to 100:1, preferably from about 2:1 to 50:1, and more preferably from about 5:1 to 20:1.

The hydrorefining process can be operated to achieve predominantly desulfurization and demetallization of the feed with mild hydroconversion by maintaining the hydrorefining zone at the temperature ranging from about 650° to about 750° F. with a hydrogen partial pressure ranging from about 500 to about 1,500 psig, whereby at least a portion of the sulfur in the feed is converted to hydrogen sulfide. Feed metals (usually iron, nickel and vanadium) which form the active catalyst upon reaction with an aluminum alkyl compound are rejected from the feed, under process conditions, as a finely divided solid which also comprises an oil insoluble carbonaceous component. The metal-containing solids can be removed from the oil product by conventional means, e.g. settling and draw-off, centrifugation or filtration.

The hydrorefining zone can be operated as predominantly a hydroconversion process by maintaining the reaction zone at a temperature ranging from about 750° to about 1000° F. with a hydrogen partial pressure ranging from about 1,500 to about 3,000 psig, whereby the oil feed is converted to lower boiling products such as light petroleum gases, naphtha, middle distillate, etc., by reaction with the hydrogen.

Furthermore, depending on the operating conditions, the process can be used to effect denitrogenation or partial denitrogenation, and conversion of the highly carbonaceous material deficient in hydrogen such as asphaltenes, to liquid products. The catalytically active species, recovered from the oil product as a composite with an oil insoluble carbonaceous solid may be recycled, if desired.

A hydrogen-containing gas is introduced into the hydrorefining zone to contact the oil feed. Any source of hydrogen gas can be used. The gaseous stream may be concentrated, or dilute, purified or impure (e.g. containing small quantities of hydrocarbons, sulfur compounds or carbon oxides). Preferably, the hydrogen partial pressure maintained in the hydrorefining zone is at least 500 psig. In addition to or instead of molecular hydrogen, a chemical source of hydrogen can be used, such as a hydrocarbon hydrogen donor, e.g. cylohexane, tetralin, decalin, naphthenes, etc. The hydrorefining reaction can be carried out in any type of process equipment, that is, slurry, stirred reactor, a sump phase reactor with distillation of volatile products and purging, if desired, of a slurry portion or part thereof or an actual separation of the dense phase material and recycle thereof.

PREFERRED EMBODIMENTS

The following examples are presented to illustrate the invention.

EXAMPLE 1

A series of experiments was conducted in which triethyl aluminum was used as a metal alkyl compound and a Safanyia atmospheric residuum or a Jobo crude oil was used as feed. The feeds were dried by azeotroping with toluene. The runs were conducted in a standard 300 ml. Autoclave Engineer's Autoclave with magnedrive stirring. Twenty weight percent triethyl aluminum in n-heptane was injected into the oil feed prior to heat up under an atmosphere of hydrogen. Yield and conversion data shown in the examples have been adjusted to compensate for the n-heptane added with the triethyl aluminum. The operating conditions and results of these experiments are summarized in Table I. As can be seen from Table I, runs 2, 3 and 5, which are runs in accordance with the present invention, show that a metal alkyl compound, specifically triethyl aluminum, can be used to activate a small amount of transition metals normally contained in heavy hydrocarbon oil feeds for catalytic hydrorefining. Run 1 is a control run made without the addition of a metal alkyl compound. In run 2, which is a run in accordance with the invention, utilizing triethyl aluminum, coke yield was cut roughly in half relative to the control run, desulfurization, demetallization and Conradson carbon destruction were increased. The API gravity of the oil product was also higher in the runs in accordance with the invention. It should be noted that hydrogen consumption is an indicator of catalytic activity and that it shows that the triethyl aluminum-treated oil is most active. In run 3, the concentration of triethyl aluminum was doubled, however, the hydroconversion results were worse than in run 2. This shows that the increase in catalytic activity noted in run 2 is not a function of the metal alkyl compound of itself and, furthermore, that excessive amounts of metal alkyl (generally the ratio should not exceed 100/1) results in catalyst deactivation.

TABLE I
FEED METALS ACTIVATION WITH TRIETHYL ALUMINUM

| Run No. | 1 | 2 | 3 | 4 | 5 |
|---|---|---|---|---|---|
| Feed | | Safaniya | | | Jobo |
| Ni/V/Fe, wppm | | 23/77/5 | | | 97/496/6 |
| AlEt₃, Wt. % on Feed. | 0 | 1.9 | 3.6 | 0 | 1.9 |
| Mole Ratio, AlEt₃/Trans. Metal | 0 | 93 | 175 | 0 | 17 |
| Conditions | | | | | |
| Time, Min. | 36 | 60 | 60 | 60 | 60 |
| Temp., °F. | 820 | 820 | 820 | 820 | 820 |
| Pressure (Avg.), Psig | 2000 | 2500 | 2500 | 2500 | 2300 |
| H₂ Consumed, SCF/B | ~100 | ~500 | ~400 | | |
| Yields, Wt. % On Feed | | | | | |
| C₅- Gas | 4 | 5.0 | 6.0 | 7.0 | 6.8 |
| Coke | 10 | 5.5 | 6.3 | 9.1 | 5.6 |
| Liquid | ~85 | ~89 | ~87 | ~83 | ~86 |
| Liquid Inspections | | | | | |
| API Gravity | 14.5 | 23 | 13 | 19.6 | 22 |
| Desulfurization, % | 20 | 31 | 17 | 28 | 40 |
| Demetallization, % | 79 | 82 | 86 | 77 | 51 |
| Con. Carbon Destroyed, | 70 | 57 | 26 | ~45 | 56 |

EXAMPLE 2

A series of experiments was conducted in which a transition metal compound, specifically vanadyl phthalocyanine, was added to Jobo crude. The operating conditions and results are summarized in Table II.

TABLE II
ALUMINUM ALKYL ACTIVATION WITH SUPPLEMENTAL VANADIUM PRESENT AS VANADYL PHTHALOCYANINE

| Run No. | 6 | 7 |
|---|---|---|
| AlEt₃, Wt. on Feed | 0 | 1.9 |
| Wppm Vanadium as added Vanadyl Phthalocyanine | ~600 | ~600 |
| Mole ratio, AlEt₃/Trans. Metal | 0 | 8 |
| Conditions | | |
| Time, Min | | 60.0 |
| Temp., °F. | | 820 |
| Pressure (Avg.) Psig | | 2300 |
| H₂ Consumed, SCF/B | 725 | 820 |
| Yields, Wt. % on Feed | | |
| C₅- Gas | 4.5 | 4.0 |
| Coke | 2.7 | 1.7 |
| Liquid | ~91 | ~92 |
| Liquid Inspection Summary | | |
| API Gravity | 23 | 21 |
| Desulfurization, % | 44 | 47 |
| Demetallization, % | 72 | 84 |
| Con. Carbon Destroyed, % | 49 | 58 |

As can be seen from Table II, run 6 shows that the addition of 600 weight parts per million vanadium as vanadyl phthalocyanine to the Jobo crude improved hydroconversion relative to the Jobo control run (run No. 4 of Table I).

However, run 7, which is a run in accordance with the present invention, in which triethyl aluminum and vanadyl phthalocyanine are combined, the results are further improved regarding less coke production, better demetallization and Conradson carbon reduction.

What is claimed is:

1. A process for hydrorefining a heavy hydrocarbonaceous oil containing metal compounds naturally occurring in said oil, which comprises, contacting said heavy oil, in a hydrorefining zone, with hydrogen and an aluminum alkyl compound, at hydrorefining conditions, including a temperature ranging from about 500° to about 1500° F. and a pressure ranging from about 500 to about 3000 psig.

2. The process of claim 1 wherein said heavy hydrocarbonaceous oil contains at least 1 weight percent sulfur.

3. The process of claim 1 wherein said heavy hydrocarbonaceous oil contains sulfur and wherein said hydrorefining process is conducted at a temperature ranging from about 650° to about 750° F and a hydrogen partial pressure ranging from about 500 to about 1500 psig.

4. The process of claim 1 wherein said hydrorefining process is conducted at a temperature ranging from about 750° to about 1000° F and a hydrogen partial pressure ranging from about 1500 to about 3000 psig.

5. The process of claim 1 wherein the mole ratio of said aluminum alkyl compound to the total moles of said metal compounds, calculated as the metal, ranges from about 1:1 to 100:1.

6. The process of claim 1 wherein the mole ratio of said aluminum alkyl compound to the total moles of said metal compounds, calculated as the metal, ranges from about 2:1 to about 50:1.

7. The process of claim 1 wherein the alkyl constituent of said aluminum alkyl compound contains from about 1 to about 18 carbon atoms.

8. The process of claim 1 wherein the total concentration of said metal compounds, calculated as the metal based on the oil, ranges from about 0.005 weight percent to about 40 weight percent.

9. The process of claim 1 wherein the total concentration of said metal compounds calculated as the metal based on the oil, ranges from about 0.01 to about 5 weight percent.

10. The process of claim 1 wherein the total concentration of said metal compounds in said oil ranges from about 0.05 to 1 weight percent, calculated as the metal based on said oil.

11. The process of claim 1 wherein vanadyl phthalocyanine is added to said heavy oil.

12. A process for hydrorefining a heavy hydrocarbonaceous oil containing at least 1 weight percent sulfur and naturally occurring metal compounds, said metal compounds, said metal compounds comprising at least one metal selected from the group consisting of Groups IB, IVB, VB, VIB, VIIB, VIII and mixtures thereof of the Periodic Table of Elements, which comprises, contacting, in a hydrorefining zone, said heavy oil with hydrogen and an aluminum alkyl compound, the molar ratio of said aluminum alkyl compound to said metal compounds, claculated as the metal, ranging from about 1:1 to about 100:1, at hydrorefining conditions, including a temperature ranging from about 500° to 1500° F. and a pressure ranging from about 500 to about 3000 psig.

* * * * *